(12) United States Patent
Reynolds et al.

(10) Patent No.: US 8,687,776 B1
(45) Date of Patent: Apr. 1, 2014

(54) SYSTEM AND METHOD TO ANALYZE HUMAN VOICE CONVERSATIONS

(75) Inventors: Bradley Reynolds, Olmsted Falls, OH (US); Stephen Abbey, Chagrin Falls, OH (US)

(73) Assignee: Mongoose Metrics, LLC, Independence, OH (US)

( * ) Notice: Subject to any disclaimer, the term of this patent is extended or adjusted under 35 U.S.C. 154(b) by 0 days.

(21) Appl. No.: 13/228,295

(22) Filed: Sep. 8, 2011

Related U.S. Application Data

(60) Provisional application No. 61/380,984, filed on Sep. 8, 2010.

(51) Int. Cl.
*H04M 11/00* (2006.01)

(52) U.S. Cl.
USPC ..................... 379/88.18; 705/26.7

(58) Field of Classification Search
USPC ........... 379/88.01–88.04, 88.08–88.09, 90.01
See application file for complete search history.

(56) References Cited

U.S. PATENT DOCUMENTS

| | | | | |
|---|---|---|---|---|
| 7,809,605 | B2 * | 10/2010 | Tonse et al. | 705/14.54 |
| 8,249,915 | B2 * | 8/2012 | Iams | 705/7.32 |
| 8,254,535 | B1 * | 8/2012 | Madhavapeddi et al. | 379/88.18 |
| 2007/0266020 | A1 * | 11/2007 | Case et al. | 707/5 |
| 2008/0201143 | A1 * | 8/2008 | Olligschlaeger et al. | 704/235 |
| 2008/0235203 | A1 * | 9/2008 | Case et al. | 707/5 |
| 2009/0136017 | A1 * | 5/2009 | Hoareau | 379/216.01 |
| 2009/0232288 | A1 * | 9/2009 | Forbes et al. | 379/93.23 |
| 2011/0145066 | A1 * | 6/2011 | Law et al. | 705/14.54 |
| 2011/0268260 | A1 * | 11/2011 | Madhavapeddi et al. | 379/88.13 |
| 2012/0022950 | A1 * | 1/2012 | Gilbert et al. | 705/14.66 |

\* cited by examiner

*Primary Examiner* — Maria El-Zoobi
(74) *Attorney, Agent, or Firm* — Levine Bagade Han LLP (57) ABSTRACT

A system and method for analyzing conversations is disclosed. The analysis can provide data to show behavioral trending. The system and method can be used to analyze telephonic conversations. The system and method can analyze both voice and data. The system and method can also be integrated with other systems, such as CRM databases.

8 Claims, 11 Drawing Sheets

| John Deere Tractor |
| Red Tractor |
| Green Tractor |
| Clutch Options |
| Towing Capacity |
| Engine Size |
| Horsepower |
| Tractor Sales |
| Tractor Leasing |
| Order Deposit |
| Social Security Number |
| Not Interested |
| Not looking to buy |
| Talk to Supervisor |

Tags: Suggested Web Keywords

Fig. 12a

Transcription 1: "A quick brown fox jumps over a lazy dog"

Transcription 2: "I have been having a lot of problems with a brown fox in my yard"

Transcription 3: "I would like to talk to animal control"

Transcription 4: "I am having a problem with animals in my yard"

Fig. 12b

SYSTEM AND METHOD TO ANALYZE HUMAN VOICE CONVERSATIONS

CROSS-REFERENCE TO RELATED APPLICATION

This application claims priority to U.S. Provisional Application No. 61/380,984, filed 8 Sep. 2010, which is incorporated by reference herein in its entirety.

BACKGROUND

1. Technical Art

A system and method for analyzing human conversations to provide data on behavior trending is disclosed, for example for voice conversations.

2. Description of Related Art

Call tracking technology systems (such as Call Tracking Systems available from Mongoose Metrics, LLC, Independence, Ohio) are used to improve online and offline marketing. Such systems use underlying technologies which take a digital call recording and convert it into computer readable text strings.

One method is large vocabulary continuous speech recognition (LVCSR). LVCSR receives an input digital call and fully transcribes the call into text based on a full dictionary of the language in question.

An alternate method is phonetic matching. Phonetic matching receives an input digital recording and searches for specific phrases, returning matching and confidence.

BRIEF SUMMARY OF THE INVENTION

A system and method for analyzing human conversations, such as voice conversations over telephones, is disclosed. An analog human voice can be converted to a digital representation. The digital representation may be converted in real-time (i.e., as the words are being spoken), or at a delayed time in the future of the speaking of the words, such as after the conversation. The digital representation can be text, or can be in a data format that can be further converted to text. The text and/or the analog or digital representation of the conversation, or a derivative thereof (e.g., voice tone data) can then be analyzed. The analysis may be performed on a sample made of the complete conversion of the digital representation of the entire conversation or against one or a few words in a phrase within the conversation. The sample can be a portion of the digital representation to be analyzed. The sample can be part or all of the communication from the single caller or both callers—or more if there are more than two callers. The digital representation can be the conversion of the analog words into data, for example audio or text files. The processor can analyze the sample of the digital representation against one or more predefined or dynamically changing templates.

The processor can then compare each sample singularly against the template or set of templates to gauge compliance against the one or more rule sets in each template. Each template can be a data file containing one or more rule sets. Multiple templates can be combined into a single data file subdivided into each template.

The processor can organize the information contained in each sample in aggregate into groupings based on business rules. The rule sets in the templates can include sets of the business rules.

An example of a grouping would be for the processor to analyze all samples from a single customer or company for compliance with rules for sales or marketing goals. From a review of the results of this aggregate analysis, a business could understand the general trending for business metrics (e.g., marketing, advertising, sales, customer satisfaction, and customer support) across their entire business.

Another example of an analysis based on a template would be to aggregate information for all samples which contain a specific trigger word or phrase. A template could be an organized set of business rules, topics, brands, people, perspectives, emotions, actions, behaviors or timescales that can identify, compare and measure the conversation sample against the significant topics, brands, people, perspectives, emotions, actions, and behaviors contained in the organized set of digital representations.

To analyze conversations for topics, brands, perspectives, actions, and behaviors, the system can construct a list of tags as described below and then group the tags into events as well as event flows. This construction can be accomplished manually or programmatically (e.g., by execution of software instructions by a processor). Once those relationships have been constructed, the system can apply them in an analysis against each recording. To identify topics and brands, the system can have identified words in the conversation which correspond to those pre-defined tags. When the system finds the word corresponding to the tag in the audio or text file, the system can indicate that the topic and/or brand (or other tag) has been discussed. To identify perspectives, actions and behaviors, the system can look at tag groups and/or events.

If enough constituent tags within a tag group corresponding to a perspective, behavior, or action are met, then the system and/or user can conclude that perspective, behavior or action are present on the call. For example, if the tag phrases "American Express" and "would like to buy" are found inside of the audio which have been grouped inside of the "completed sale" event, the system and/or user can conclude that a sale event has been triggered.

Similar groupings apply to perspectives and behaviors. To understand emotions, the system can analyze the audio file for quick changes in input gain. This allows the system and/or user to understand when the caller or callee is raising their voice, and can indicate that the emotion dynamic has changed on the call. To understand people (from the callee—i.e., call recipient—perspective), the system can send caller ID information which a user can correlate to the particular callee that receives the call (e.g., in situations when a user is monitoring data for a large group of systems, such as at a call center, and each system has an individual callee and/or agent receiving the call). In this way the system and/or user can understand the performance and style with which a particular callee and/or agent is handling incoming calls. To understand people from a caller perspective, the system can provide a listing of calls grouped by a particular ANI/Caller ID to show the different interactions from a specific caller.

Before, during, and/or after the primary analysis described above, the processor can categorize and post the results of the primary analysis into a useful data structure for presentation and actionable additional analysis of the data. If certain secondary triggers are satisfied by the primary analysis, the processor can perform an even more detailed secondary analysis of the conversation sample(s). For example, the secondary analysis can analyze the meaning of the telephone conversation content in duplex (e.g., both callers' voices), simplex one-way far side (e.g., the receiver caller's voice), and/or simplex near side manner (e.g., the dialing caller's voice). The resulting analysis data can then be categorized and stored into a useful data structure, such as a relational or object database. The conversations can be fully transcribed and analyzed or only key phrase transcription and/or matching within the conversation can be performed.

BRIEF DESCRIPTION OF THE DRAWINGS

FIGS. 5 through 8 illustrate variations of event paths or flows based on a portion of the tag groups and events shown in FIG. 4.

FIG. 11b illustrates exemplary suggested tags derived from the keyword frequency chart shown in FIG. 11a.

FIG. 12b illustrates suggested tags derived from the call transcriptions of FIG. 12a.

DETAILED DESCRIPTION

Figure 1A:
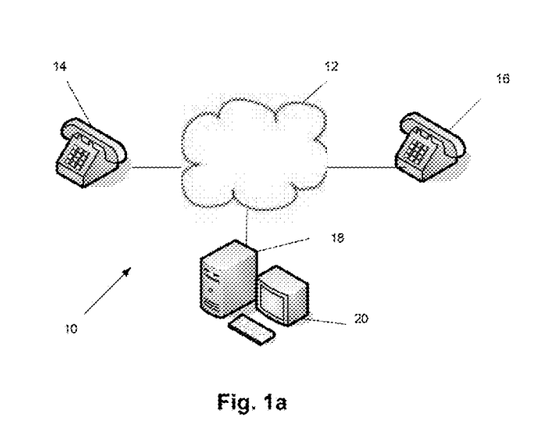
FIGS. 1a through 1d illustrate variations of the telephone hardware network configurations across which the system and method operate.

A conversation analysis system having a hierarchical structure of computer hardware and/or software that can analyze conversations for words and/or phrases to result in an understanding of conversational flow in a telephone conversation is disclosed. The system can include or be a part of a telephone-computer network 10. The system can be used for linguistic analysis, for example to reach a business conclusion. FIG. 1a illustrates a variation of the telephone-computer network 10. The telephone-computer network 10 can have a telephone switch network 12. The telephone switch network 12 can be a PSTN, a PBX, EPABX, the internet, a WAN or LAN, for example carrying a VOIP call, or combinations thereof.

The caller can use a calling telephone 14 connected to the telephone switch network 12 to call a receiving telephone 16 which is used by the receiver. The receiving telephone 16 can be connected to the telephone switch network 12. The call can be routed from the calling telephone 14 through a telephone switch network 12 to the receiving telephone 16. A computer 18, such as a server, desktop or laptop computer, can intercept or be routed the call data directly from the telephone switch network 12. The computer 18 can have a processor and memory (e.g., RAM such as flash memory and/or hard drive memory), input and/or output devices 20, for example one or more input devices, such as a keyboard and/or mouse, and one or more output devices such as a monitor. The methods described herein can be performed as executable software and/or hardware on the computer 18, for example being stored on memory in or accessible by the computer 18.

The conversation analysis system can be the computer 18, or a network of computers and the receiving phone 16 or a network of receiving phones. The conversation analysis system can be part or all of the telephone-computer network 10. The receiving phones 16 and computers 18 can be separate elements or integrated into a single device. Any of the phones can be landline or POTS phones, cellular, VOIP, satellite phones, separate from or integrated with any computers or combinations thereof.

Figure 1B:
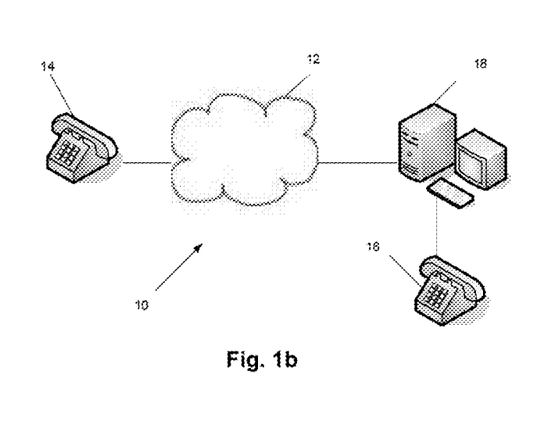
Figure 1C:
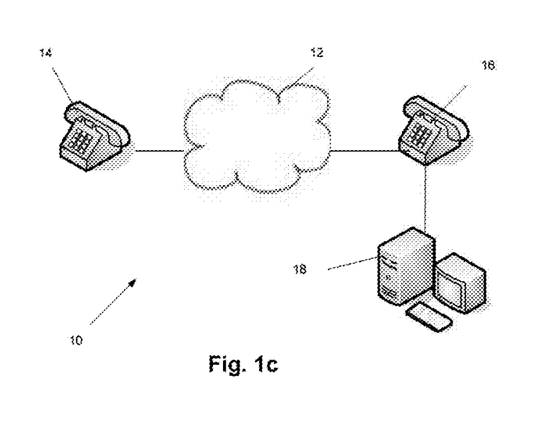
Figure 1D:
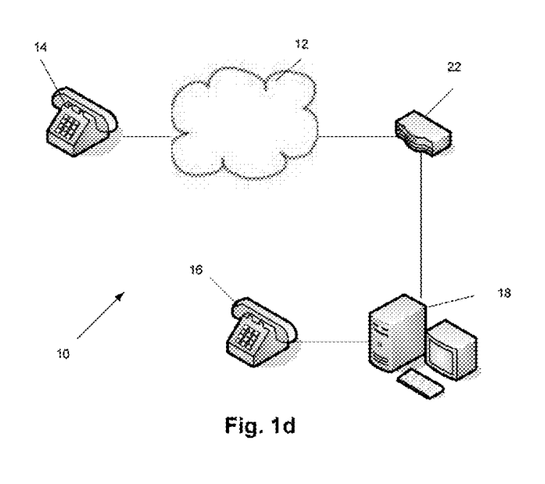

FIG. 1b illustrates that the telephone switch network 12 can connect the calling telephone 14 to the computer 18. The computer 18 can then route the voice data to the receiving telephone 16. FIG. 1c illustrates that the receiving telephone 16 can route the call data to the computer 18. FIG. 1d illustrates that the calling telephone 14 can connect to a router 22 or internal switch on the receiver's side of the telephone switch network 12. The incoming call can then be directed to the computer 18 (as shown) and/or the receiving telephone 16. If the call is routed to only one of the computer 18 or receiving telephone 16, that device (i.e., the computer 18 or receiving telephone 16) can also send the data to the other device (i.e., the other of the computer 18 or receiving telephone 16).

The phone 14 or 16 and the computer 18 can be a single device, such as a smartphone, a computer 18 that executes a VOIP application to enable calling through the computer 18, a computer 18 with an analog phone peripheral, or a combination thereof.

One or more analysis applications executing on the processor of the computer 18 can determine a binary or multimodal result, such as a transactional conclusion (e.g., "Did a sale happen?" or "Was a customer support problem solved?"), and/or understand the context of conversation path flows with a particular result as the end goal. A telephone or other conversation can be separated into a constituent set of events that might be general across all businesses or specific to a particular business or industry segment.

Figure 2:
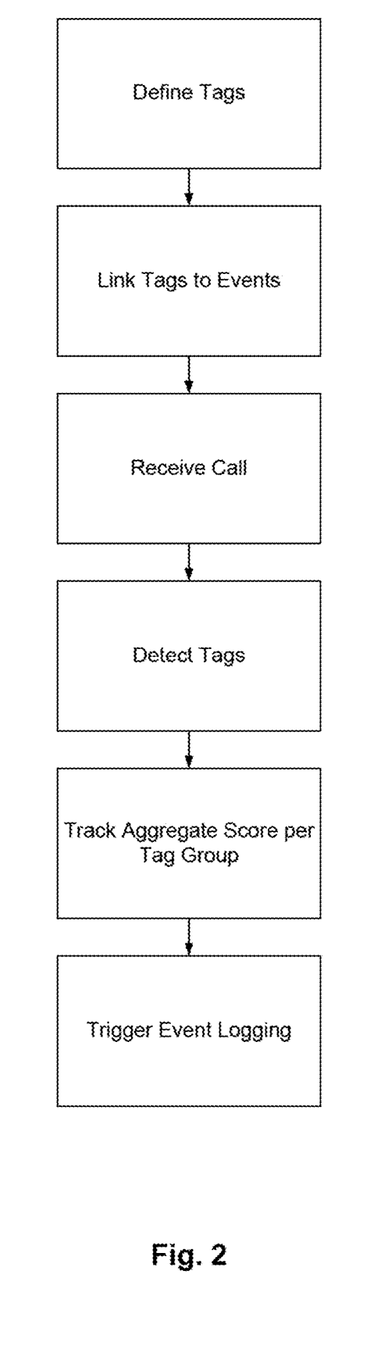
FIG. 2 illustrates a variation of a method for analyzing a conversation.

FIG. 2 illustrates a variation of the analysis performed by the processor, as instructed by one or more software programs and/or hardware. The method can begin by initially defining tags. The tags can be keywords, voice inflections (e.g., indicative of mood), phonetics (e.g., indicative of accents), background noises (e.g., indicating distractions or calling from a moving vehicle), or combinations thereof. The tags can be stored locally in the memory of the computer or stored in remote memory and accessible by the computer over a network connection.

The caller can then call the receiving phone and communicate data (e.g., words, tone and accents of a conversation, touch tones, background noises) with the receiver. The system review the conversation as the conversation happens (i.e., in real-time) or at a delayed time from a recording or transcript. The computer can receive and process/analyze the communicated data. The system can detect the tags that occur within the data, such as keywords or phrases in the conversation or a sequence of touch tones dialed.

The system can then lookup the score for each tag detected and track the aggregate scores for each tag and/or each tag group. Once the score for the tag group exceeds the threshold score required for an event, the system will trigger logging of the event in memory.

The system can continue to detect tags until instructed to stop (e.g., if an instruction exists to stop when a resolution event is detected), or the entire conversation is analyzed.

Figure 3:
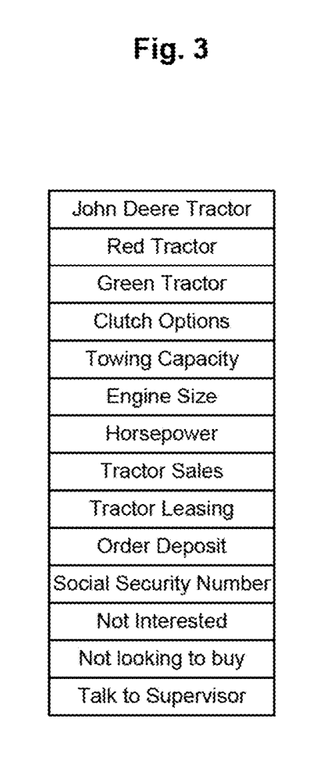
FIG. 3 illustrates a variation of a list of exemplary tags.

FIG. 3 illustrates a table of exemplary tags. The tags can be stored in the memory of the computer shown in FIGS. 1a through 1d or another computer. The tags can be stored in a relational or object database.

The method can include organizing the tags or developing a constituent set of tags within tag groups. Each tag group can be linked to a representative event and, possibly but not necessarily, event paths. These links are established by understanding the customer business process and constructing the universe or list of tags, then grouping those tags into tag groups, then linking those groups to event paths.

Figure 4:
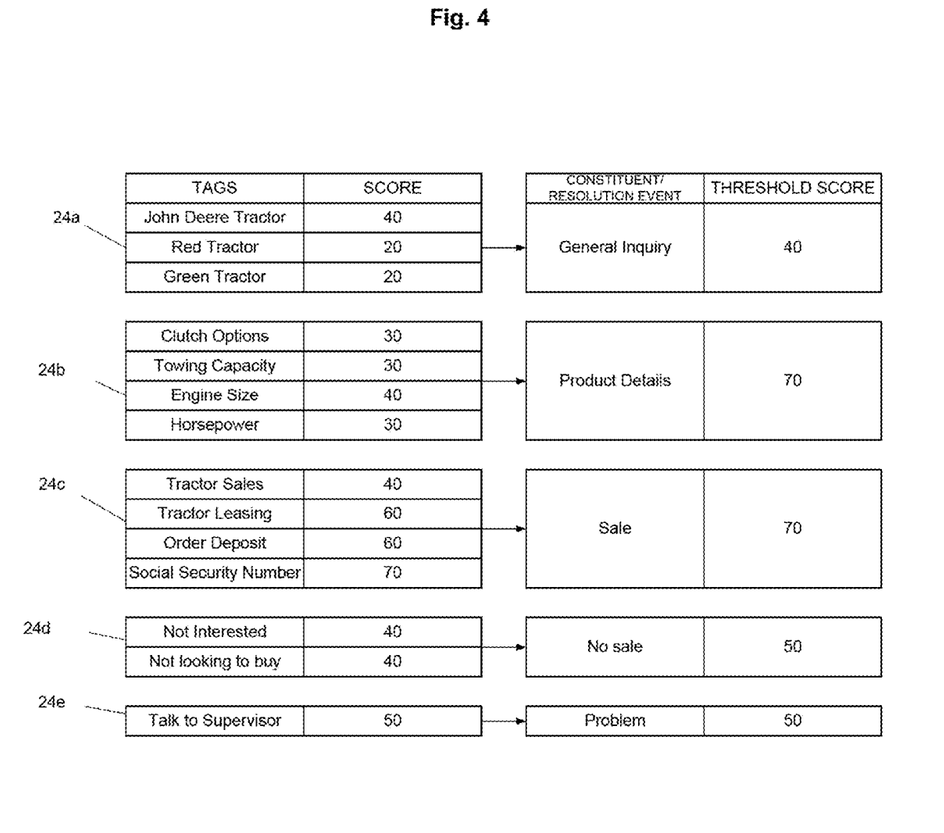
FIG. 4 illustrates a variation of tags clustered into tag groups and each tag group associates with an event.

FIG. 4 illustrates that the tags can be grouped into categories or groups, such as the first through fifth tag groups 24a through 24e, respectively, as shown. The tag groups 24 can each contain a list of words or phrases in a language and a corresponding score allocated to each tag. Each tag group 24 can have a constituent event or resolution event and minimum threshold score for the event. The data shown in FIG. 4 can be stored in one or more databases on the computer 18 or other computers on a network.

If a minimum detection confidence is satisfied for the tag (e.g., if the tag was voiced clearly enough to conclude that it was indeed spoken with sufficient confidence), then the score is added to the overall event score. If the tag is detected in the recording but the minimum confidence is not met, the tag score is not added to the overall event score. If tags are repeated in the data (i.e., transcribed voice) sample, the score may be repeatedly tallied, not tallied upon repeated detection, or the tag may be assigned a corresponding decay factor to the score which indicates future hits are valued less than the initial hit, for example at a step decay (e.g., the first detection is 30 points, all future detections are 10 points, and/or after the fifth detection no additional points are allocated), linear decay (e.g., the first detection is 30 points and all future detections are 4 points less than the previous detection until the allocated points reach zero per detection), exponential delay (e.g., each detection is allocated a number of points that are a constant fraction of the number of points allocated to the previous detection: the first detection is allocated 30 points, the second detection is 15 points, the third detection is 7.5 points, etc.), or a combination thereof.

The tag scores can be pre-determined by the user. The tag scores can be dynamically determined by the computer or by another computer with a network connection to the computer, in response to tags used system-wide (e.g., if the system is detecting a higher correlation between the tag "Green Tractor" and a sale, the system can increase the score for "Green Tractor").

FIGS. 5 through 10 illustrate the tag scores in parentheses next to the respective tags. FIGS. 5 through 10 also illustrate examples of tags detected in an exemplary conversation by showing the tags underlined.

Figure 5:
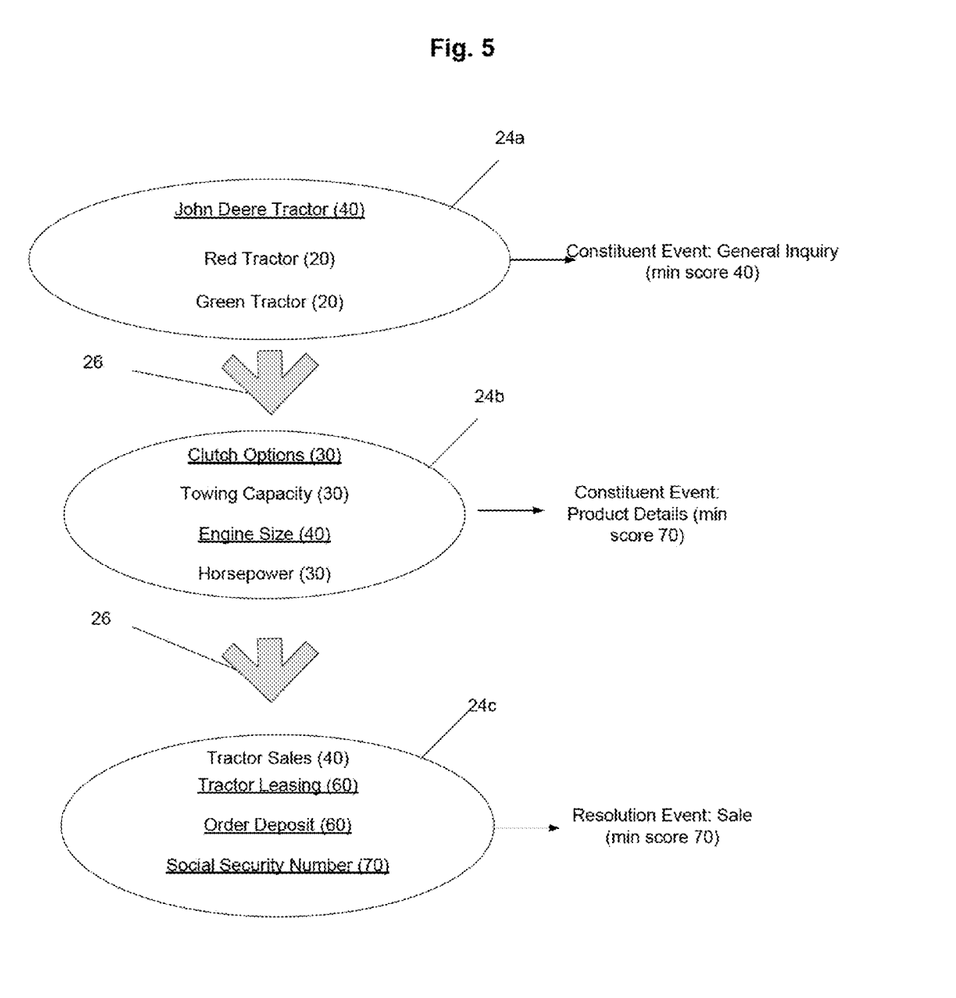
FIG. 5 illustrates a variation of an event path, such as a detailed product path.

FIG. 5 illustrates an exemplary event path 26 during a call. When the system (e.g., the computer 18 in the system) detects tags that, in aggregate, sum a score greater than the threshold score for the constituent event or resolution event, the system can trigger the logging of the constituent event of the resolution event indication the resolution of the conversation. The constituent event and/or resolution events can be stored for real-time, dynamic or later business analysis.

Logging can include creating a separate file which identifies the telephonic communication or including data within the telephonic communication file that indicates that the event threshold was achieved. Logging can include recording the aggregate score for any or all of the tag groups 24 and/or individual tags, and/or recording the aggregate scores for which tag groups (which may or may not include individual tag scores) exceeded their respective threshold scores. Logging can include recording the data as text, html, xtml, audio data, video data, or combinations thereof. The logged data can be saved onto the memory of the computer analyzing the call and/or on memory of another computer, such as one connected by a network to the computer analyzing the call.

As shown in FIG. 5, the allocated scores are shown in parentheses adjacent to the tags. The minimum threshold scores are shown adjacent to the constituent and resolution events in parentheses. The detected tags (shown merely for exemplary purposes) are indicated by underlines.

FIG. 5 illustrates that the system can conclude that the conversation included a general inquiry and a discussion of the product details. The constituent events for "general inquiry" and "product details" are triggered in the example shown. The constituent events can be triggered by detection of a threshold score from the corresponding group of tags which indicates some progress was made within a phone conversation.

Constituent events can indicate progress in the call, but do not necessarily indicate a resolution of the call. The system can use constituent events to create event paths 26, but do not start or stop processing of a recording of the call. A resolution event can, but is not necessarily, linked to end the recording of the conversation.

The difference between a constituent event and a-resolution event can be manually pre-set. Constituent events can be equivalent to waypoints in a conversation. For example, in an Apartment Rental application, a constituent event might be "Pet Inquiry" of which tags may include "do you accept dogs", "do you accept pets" and "do you accept cats". The existence of tags within this "Pet Inquiry" event does not necessarily bring the phone call to resolution, but can indicate the caller is interested in the animal policy of the lessor.

The resolution event can be a sale event. As shown, if the sale event threshold is 70, the "Social Security Number" tag or more than one or a repetition of other tags within the sale event tag group (i.e., the third tag group) would need to be detected before the system would trigger the sale event. The resolution or constituent event threshold score can be pre-set by the system manufacturer and/or the user.

Another example of a resolution event is a "No Sale" event. When the system detects a high enough score of tags within conversation to trigger the No Sale event (i.e., when enough tags are detected within the conversation to exceed the threshold trigger), the system can log a No Sale resolution event. Once a resolution event is detected in the call, the system can log the event path 26 as completed. Remaining tags can still be analyzed and scored in their particular event grouping.

The system can continue to track the aggregate score for each resolution and/or constituent event after the threshold score is achieved (i.e., the events can have no maximum score), for example, so the events within each call can be compared against events in other calls or within the same call to analyze and better understand the comparative differences (e.g., evaluating which event has the highest score).

The system can be set to allow only be one resolution event per call. The system can compare data between calls to determine which resolution events might have the highest confidence. For example, if the resolution event (RE) threshold for a sale is 100 points, Call A has a RE Sale score of 110 and Call B has a RE Sale score of 400, the system can have a higher confidence that Call B has been resolved as a Sale. The system can use these relative scores to help analyze calls.

The system can also identify and log pre-person call events. Pre-person call events are events on a call that occur outside of a voice conversation between people. Examples of pre-person call events include navigating through an IVR or interacting with a speech system which can help to classify or qualify a caller to a specific destination or resolution. The pre-person call event can, but does not have to, occur before a conversation between two or more live people. The data analyzed by the system can be speech, touch tone date, or combinations thereof.

The system can use audio analytics software to analyze the pre-person interaction of a caller to the system and can use that data to help optimize the customer interaction. The system can analyze the waveform of the phone call during a specific initial period of time for dial tone multi-frequency (DTMF) tones. The initial time period occupied by pre-person interactions can be calculated and recorded as a percentage of the call with no human interaction. This time period can be determined by analyzing the power of the waveform of the audio recording. For calls on which DTMF analysis is employed, the system can search for when there are time breaks when a human voice is not present.

One way the system can calculate this break is to start from the end of the call (where humans are likely present) and work back to the point where power levels of the waveform are lower (likely indicative of music on hold or some sort of IVR system). Once that offset in the audio file is found, all of the audio prior to that point is analyzed for more than 4 successive samples of the same DTMF frequency. If this break is found, the offset and the specific DTMF digit are logged. The system can then overlay the time at which DTMF was pressed onto the waveform and the data can be presented to the user to indicate how the caller navigated through the IVR system.

FIGS. 5 through 8 illustrate that event paths can be used to link constituent events together to visualize the flow of a conversation to a resolution event. Event paths 26 can be linked manually by the user and/or by the system (i.e., constructed programmatically). The system can log when each event in a call is triggered along with the trigger time at which the event is triggered (i.e., assuming that there are resolution events and/or constituent events defined). The trigger time is calculated as the time during the call where the threshold score of the particular event is surpassed. The system can then construct a time map linking when the events were triggered during the call. Once the system has constructed this path, the system can log what the path looked like as well as the relative times between events.

The system can compare the event path to other programmatically or manually generated event paths. For example, if the system were to compare or display to the user all the event paths which ended in a "No Sale" resolution event, the system can retrieve the event path log from the computer's memory (or elsewhere on the computer's network) for each call for every event path which resulted in a No Sale resolution. The computer or user can then analyze how many event paths are the same in terms of the order and presence of constituent events, for example, to determine patterns to conversations which result in a "No Sale" event.

The event path can have no constituent events and only a resolution event. Constituent events (CE) may or may not be time ordered in the event path. When a CE is triggered by a single tag which is detected to exceed the score threshold, the system can determine exactly when the constituent event occurs. When a CE is triggered by the detection of multiple tags to exceed the CE threshold, the tag contributions to the CE may happen throughout the conversation intermingled with other tags contributing to other CEs or REs.

Figure 6:
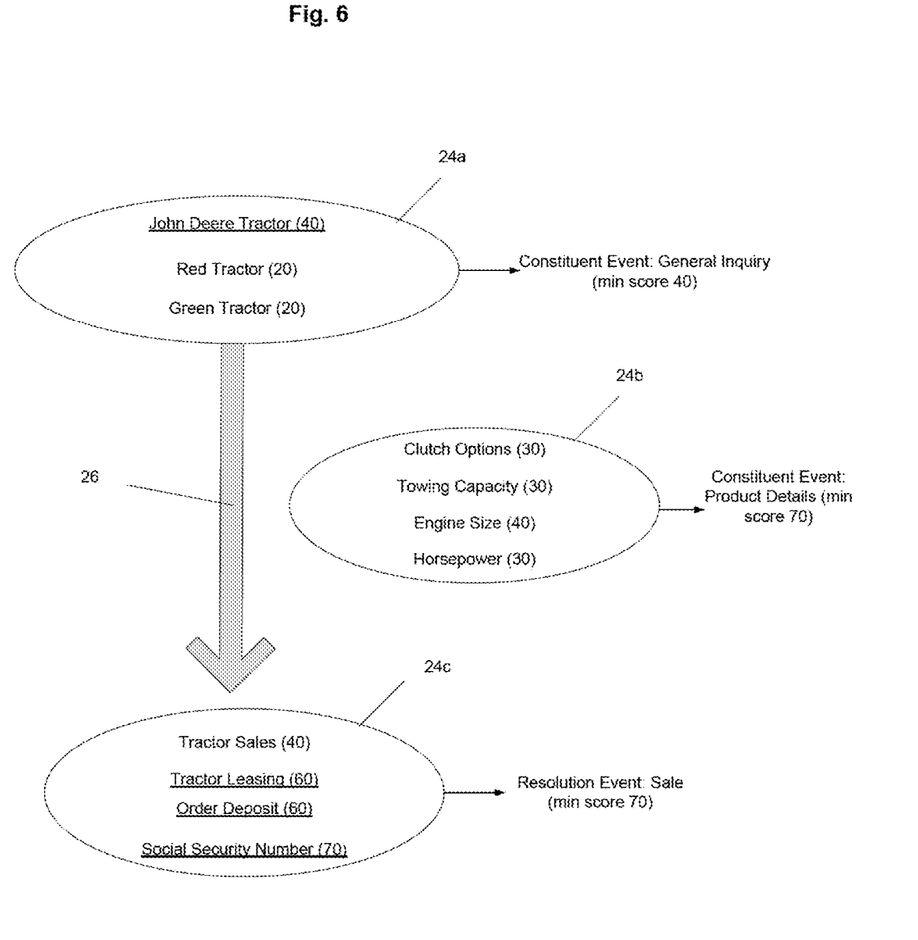
FIG. 6 illustrates a variation of an event path, such as a basic product path.

FIG. 6 illustrates a schematic example of the analysis of a conversation in which not all constituent events are triggered. The event path may not include all constituent events. In the example shown, the general inquiry constituent event is triggered and the sale resolution event is triggered, but the product details constituent event is not triggered and does not lie within the event path.

Figure 7:
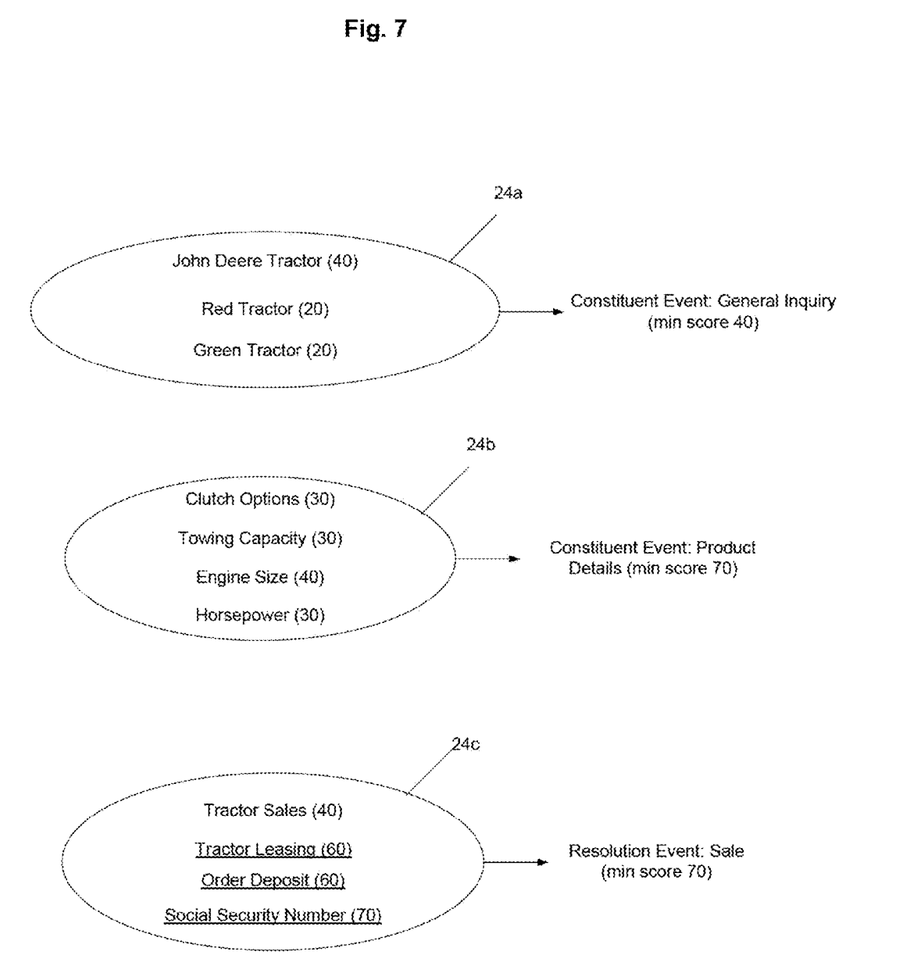
FIG. 7 illustrates a variation of an event path, for example solely for a sale.

FIG. 7 illustrates a schematic example of the analysis of a conversation with only the resolution event of an event sale triggered and no constituent events triggered. As shown, there can be a lack of an event path between events since the event path only includes a single event (i.e., the sale resolution event).

Figure 8:
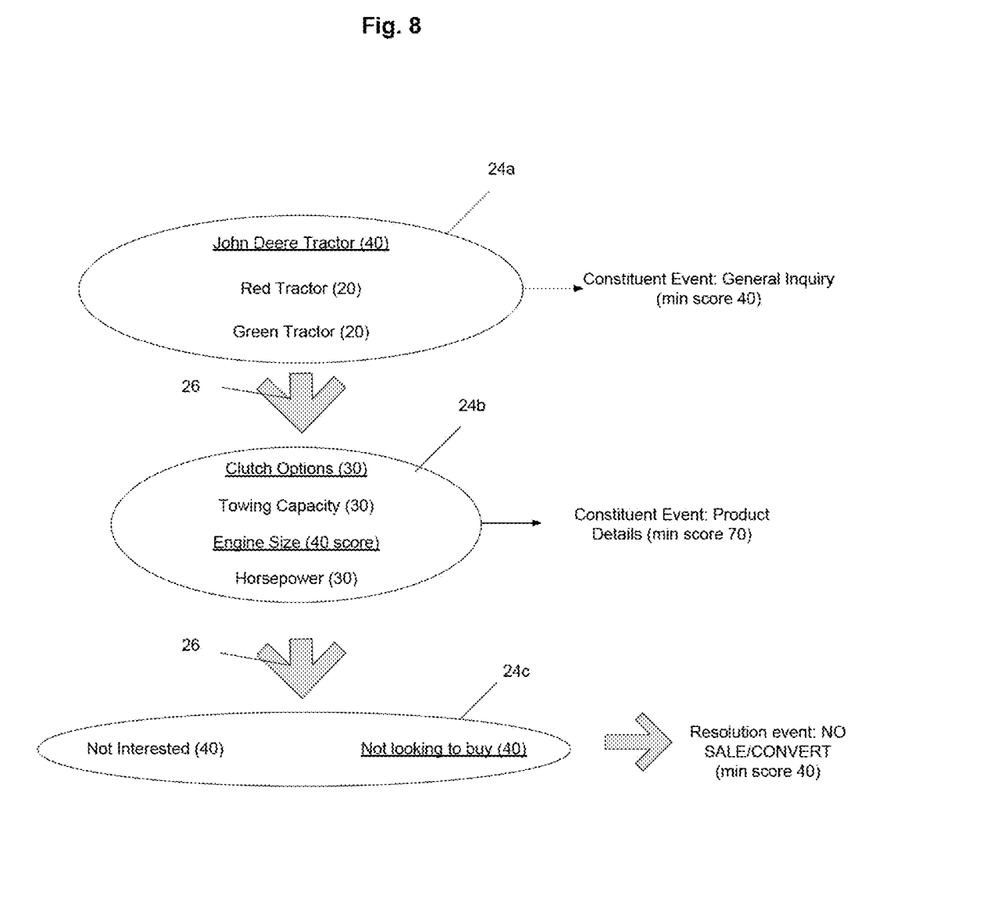
FIG. 8 illustrates a variation of an event path, for example a detailed product with no sale path.

FIG. 8 illustrates a schematic example of the analysis of a conversation with multiple constituent events triggered and a no sale resolution event triggered.

The system can create tag paths to link tags used in the conversation to the resolution event. Tag paths can trace back from the RE to determine what ordered mix of tags resulted in a particular RE. The tag paths can be compiled across a number of call conversations and statistically analyzed. The tag path can identify which tags and in what order they occur in conversations resulting in a specified RE. The tag path does not necessarily recognize any CEs.

The tag path can be constructed similarly to the event path, for example by showing the order at which different tags have occurred in the audio file and optionally with the time at which the tag was detected as being stated. The tag path may end in a tag or event. For example, if the system was analyzing the order for all tags which happen before a "Pet Inquiry" Event, the system can construct a time-ordered map of every combination of tags said before a "Pet Inquiry" event and use the map to check to see if patterns of the tags exist. The tag path might also end in a terminal tag (e.g., "credit card") and the system or user can then construct a tag path to show which tags occurred and in what order before the terminal tag (e.g., "credit card") was spoken.

The system can incorporate other, non-conversation data into the analysis. For example, the system can incorporate data produced prior to the call.

Figure 9:
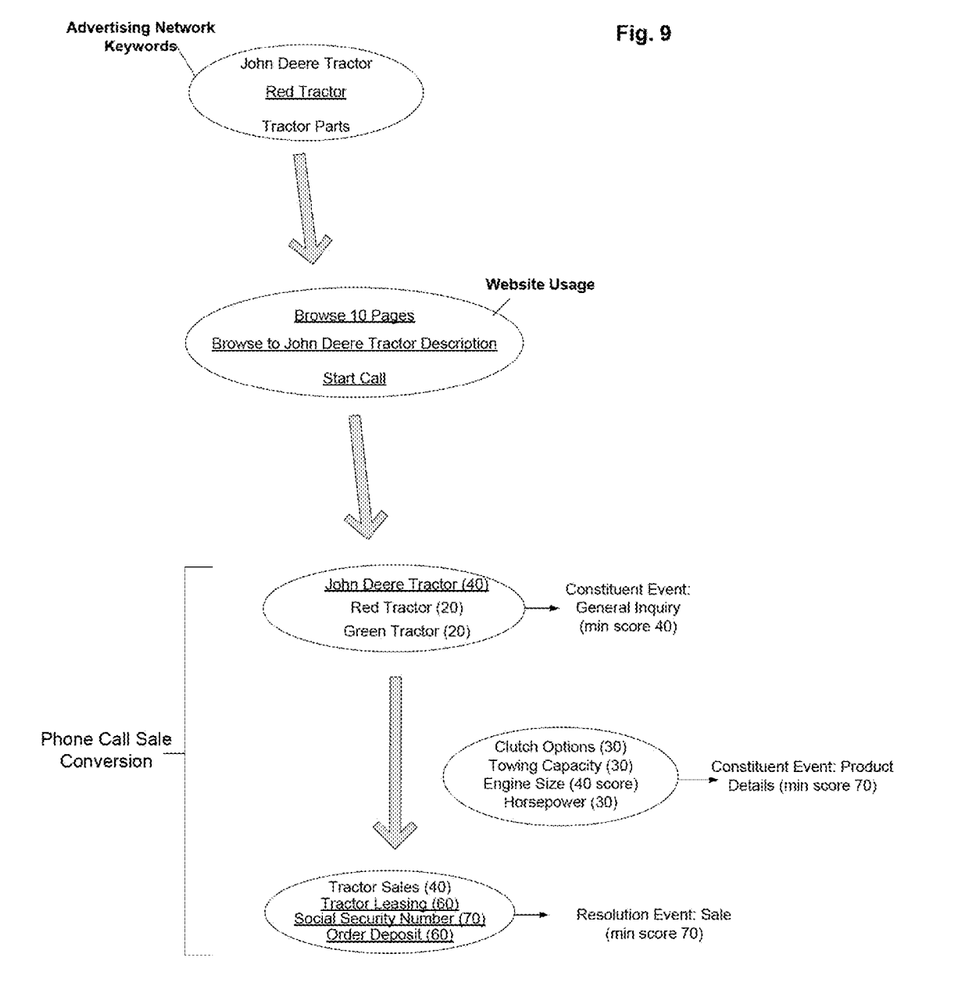
FIG. 9 illustrates a variation of a method for driving a phone sales event based on keyword triggers, for example with the keyword "Red Tractor" driving a phone sale event.

FIG. 9 illustrates that marketing channel data can be incorporated into the analysis. The system can receive data about the marketing channels (e.g., keyword, source, web page which generated the call, zip code, interaction with website) and correlate that to the phone analytics information. For example, the customer can be given a dedicated phone number for a specific period of time, such as a number shown on a specific web page. When the call is received on the dedicated phone number, the system can conclude which web page generated the call. Other information delivered through the web page can then be linked to the call. The marketing channel information can be stored in the database and correlated when the customer calls into their dedicated phone number.

The system can incorporate sales channel data into the analysis. The system can receive sales-oriented data from a website and correlate that sales-oriented data to the call analytics data (e.g., the caller added inventory items to an online shopping cart but then called, and what items are in shopping cart).

The conversation analysis system can integrate with other systems, such as other database systems. For example, the conversation analysis system can integrate with CRM, bid management, web analytics, ecommerce, user API systems, and combinations thereof.

The conversation analysis system can have a bidirectional data flow to inject conversion information (e.g., including amount of sale) directly into a CRM system. The customer data can then be further analyzed and pushed (i.e., routed, sent) to sales representatives, inventory control systems, shipping, and combinations thereof. The integrated systems can pull data from the CRM system to more effectively optimize the call analysis and tag and event recognition.

Figure 10:
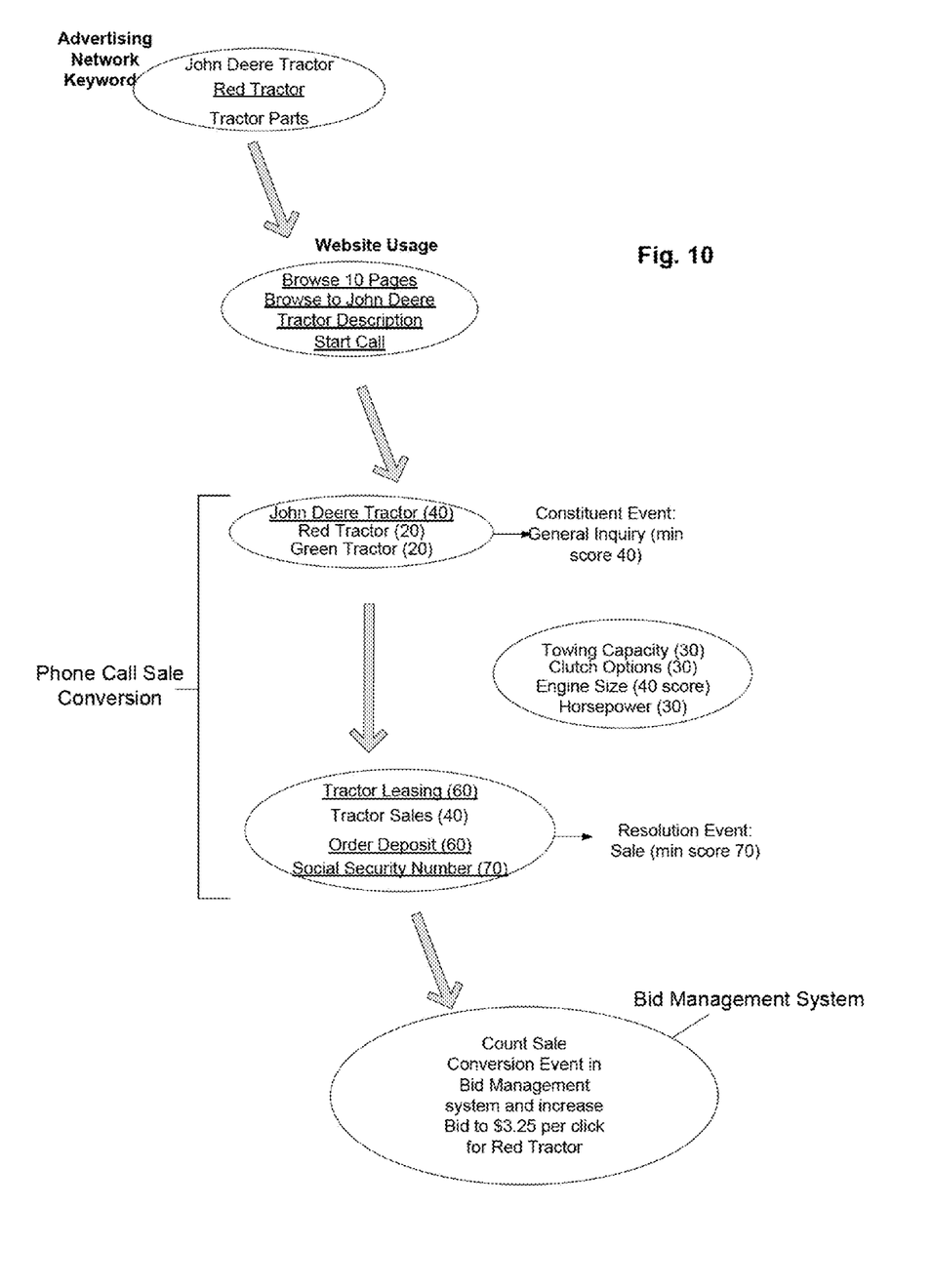
FIG. 10 illustrates a variation of a method for influencing bid management for a phone sales event based on keyword triggers, for example with the keyword "Red Tractor" driving a phone sale event which then influences bidding on keyboard "Red Tractor" through a Bid Management Integration.

FIG. 10 illustrates that the conversation analysis system can be integrated with a bid management system. The bid management system can be external to or integrated with the conversation analysis system. The user can automatically adjust bidding, in real-time or at a time in the future, on advertising based on the actual results of the phone call. The analysis of the conversation can influence sales and/or customer support procedures.

Bid management systems can index the keyword bids of companies in an effort to automate and/or simplify the process of bidding on keywords on advertising networks like Google Adwords or Yahoo Search Marketing. Because these advertising networks use a market pricing/bidding model to determine the pricing rate for keywords, the conversation analysis system described herein can use a variety of mechanisms to determine a conversion has happened on a call. The system can employ speech analytics to determine if a conversation occurred on the call. The system can also have post-call IVR entry to gather conversion (e.g., resolution event) information from the user, such as from a customer support representative on the receiving end of the call.

Once a conversion has been determined to have occurred, the call analysis information can be uploaded to the bid management system. The bid management systems can find a keyword or set of keywords more valuable when conversions have occurred. Conversions can happen solely on the web (e.g., someone fills out a web form indicating they would like more product information) or via the phone (e.g., someone calls in to talk to a sales representative). The web and call analysis systems can collect data on both the call and web-based events and upload that data to the bid management keyword hierarchy. Once those conversion events have been uploaded to the bid management system, the bid management system can have an accurate representation of the conversions associated with that keyword and alter the keyword bidding used for advertising.

The system can be integrated with a web analytics platform or system. For example, the web analytics system data can be merged with the call analysis data, for example, allowing combined analysis into the call and web-based data. Existing platforms like Google Analytics and Omniture Sitecatalyst analyze marketing efforts in comparison with sales on the web. However, these systems typically do not account for customers that convert via the phone. Through a data transfer interface, the call analysis system can upload call conversion, and keyword information into these web analysis systems, for example, enabling users to visualize the combined conversion data (i.e., web conversions and call conversion) resulting from customer website traffic.

The conversation analysis system can deliver call analysis data to external or integrated e-commerce systems, for example, for the e-commerce system to more appropriately weigh higher converting product versus lower converting products on the website/shopping cart system.

Many websites have dynamic product listing systems which show items that are the "Most Popular" or "Highest Selling". The conversation analysis system can initiate a data transfer to the website using the e-commerce system (e.g., website back-end) which can incorporate the call conversion information in the tabulation of which products are the most popular or highest selling, enabling the website to fully account for their sales and display the most popular items.

The conversation analysis system can be incorporated with an API. For example the conversation analysis system can integrate with the user's other internal systems via an API so that conversation analysis data can be represented in the user methods to optimize their other internal systems.

The system can dynamically adjust settings (e.g., tags, tag scores, events, threshold scores, or combinations thereof) or learn from external or internal data. The web page and call analysis systems can record data, such as from a single or multiple callers, which can be referred to analyze optimize the event configuration for the same caller(s) or for future callers.

The system can log the marketing source information (e.g., web page. banner or other web page ad, billboard, television, radio, other trackable advertisement generating the call), and compare the marketing source information to data detected from the conversation. For example, the system can compare keyword data from the marketing source information which generated the phone call(s) to the words detected in the calls.

The system can build events around keyword contexts by understanding keywords which can group into early stage research, shopping, and ready to buy events and then search for those keywords inside of the call conversations.

Figure 11A:
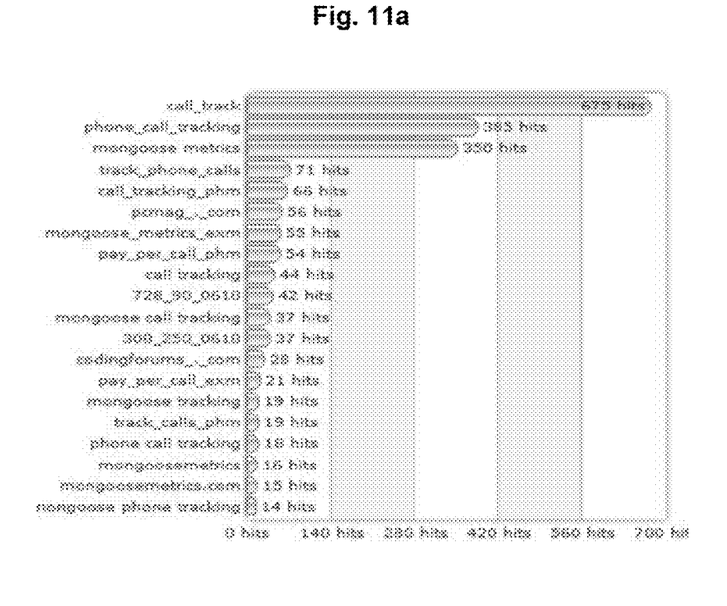
FIG. 11a illustrates a graph for quantifying tag groups or events such as an exemplary keyword frequency of a particular customer, for example for the top 20 keywords by publishings to be used by the system for keyword learning.
Figure 11B:
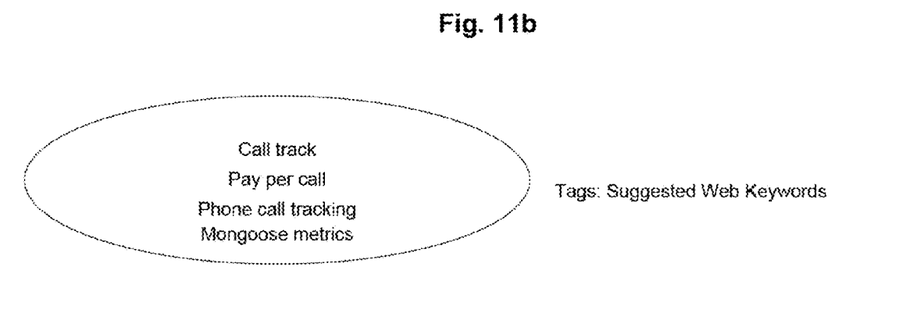

FIGS. 11a and 11b illustrate exemplary keywords from marketing keywords (used and/or hit by the caller in web page publishings) and web keywords suggested by the system to be used as tags. By using the keyword browsing history of a particular customer, the system can develop a new pool of candidate tags based on the frequency analysis of specific phrases. Correlation to web keywords hit by the caller can be used by the system as an early indicator of conversions since the web keywords are the phrases that influenced the caller to arrive at the website from which the call in number was delivered. The system can then develop a chart or tabulation of the frequency of keywords or phrases occurring in the web site traffic. The system can then use the keyword frequency chart, an example is shown in FIG. 11a, to suggest new keywords, an example is shown in FIG. 11b, to analyze for presence in a call. For example, the system can automatically create a list of tags in a "Suggested Web Keywords" tag group and put the top (e.g., about 4, as shown, or about 50) keywords into that grouping for a particular campaign. The tags could then be correlated with an event by the user or automatically by the computer. The constituent event shown in FIG. 11b is that the inquiry was from the web site, but another constituent and/or resolution event can be associated with the tag group. Also, the automatically suggested tags can be split between more than one tag group.

The system can be manually updated by the user, for example, after the user reviews the conversation and analysis data to improve the effectiveness of the system.

The system can create and/or review a transcription of the conversation. The system can perform a frequency analysis of the keywords and/or phrases detected in the phone call conversation. The system can then use the frequency analysis data to feed back into the event system to recognize new types of events. The keyword and/or phrase frequency analysis can link related words (e.g., plural and singular) into an occurrence of the same word.

Figure 12A:
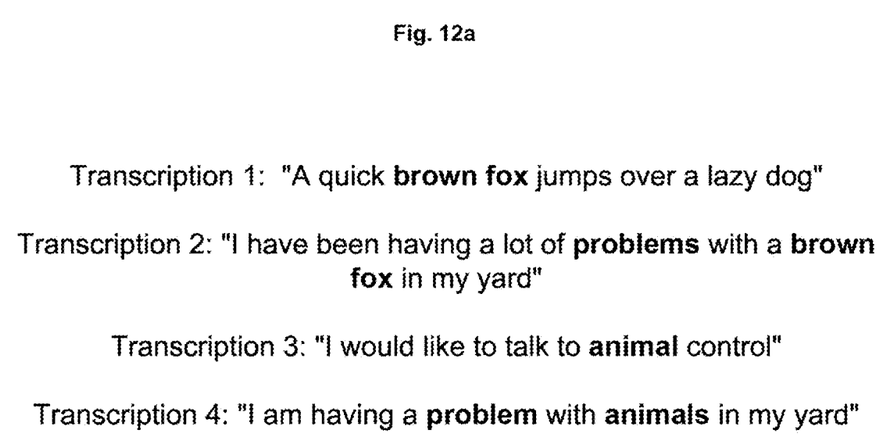
FIG. 12a illustrates variations of various call transcriptions.
Figure 12B:
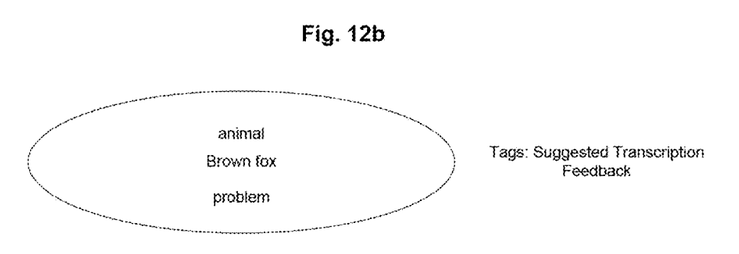

FIGS. 12a and 12b illustrate an exemplary scenario where the system can create or receive four transcriptions of voice conversations. The system can match the words "brown fox", "problem[s]" and "animal[s]" between the four transcriptions. The system can account for word order and/or word match (e.g., "brown fox" versus "brown foxes") if desired.

For example, if the transcriptions read "brown fox" and "fox brown" the system can match the individual words but not the phrase unless the system is instructed to recognize word transposition within a phrase. The system can also check a set of common words for each language (e.g., definite and indefinite articles, pronouns, etc.) excepted from the matching, if desired. For example, the receiving call center can regularly handle technical issues, and the system can notice an unusually high frequency pattern of the phrase "system failure" across a number of received call transcripts during a small time window. The system can then alert the user and/or conclude that there is likely a new event happening, create an event in real-time (i.e., dynamic creation), and escalate that event to the attention of the user, sending an alert (e.g., over e-mail).

The system can update itself (e.g., dynamically), be updated or otherwise adapt based on website feedback. For example, the system can log full visitor session information related to the visitor's interaction with the user's website. The system can then perform a pattern recognition and analysis on the visitor's interactions with and spidering of the website. The system can derive which web page generated the phone call and use data from that web page to tie into the content of the conversation to look for additional patterns, such as in the event path and/or tags or other words or phrases used.

The system can update itself (e.g., dynamically), be updated manually or otherwise adapt by learning from data from competitor information from within the industry. For example, the system can use event learning by reviewing data from different companies, for example to adjust the scores in the direction of the industry averages and to add frequently occurring tags and events from data from companies within similar industries to help create valuable (i.e., solid) events and paths to optimize conversations within other companies.

The system can update itself (e.g., dynamically), be updated or otherwise adapt by learning across all index data. Individual systems can send (e.g., upload) data to a central database holding data from multiple users. A central computer or the computer in the system can review the aggregate data from the multiple users and analyze the data (e.g., determine trends and other statistics such as averages, means, modes, standard deviations, and combinations thereof, and create a library) for tags, tag scores, events, event thresholds, event paths, and combinations thereof, in the process of operations across all user data or across user data for users in the same or related industries. The compiled data and analysis can be applied across all users or for users in specific industries. The analysis can direct the central or local computer to create a general template set which could be used by default for the system before being distributed to all users or industry-specific users. The updates can be installed automatically (e.g., from a remote, networked computer, or from the local computer of the system) or manually on the systems.

For example, the system was instructed to optimize sales, the system can employ a sales-focused settings template (e.g., containing tags, scores, events, event paths, threshold scores, etc.) which is designated to be used for all companies, or a more tailored template which is industry specific, or a finely granular template built by the user. Over time of use of the system, the system or user can add tags, events, expected event paths, and adjust tag scores and threshold scores based on system learning both manual (i.e., by the user) and programmatic.

In an exemplary use, the system can be directed by the user to investigate "No Sale" events, and/or the user can retrieve data from the system and manually investigate the "No Sale" events. The system can provide data from the calls and/or web pages that indicates that a promo code on the user's website is not showing up for the call receiving individuals (e.g., customer support representatives), for example, the promo code tag score generated by the call receiving individual can be far lower than the user's (and/or industry-specific's and/or all business's) previous history with promo codes and is causing sales not to happen.

In an exemplary use, the system can be directed by the user to investigate to check for franchise compliance events, and/or the user can retrieve data from the system and manually investigate franchise compliance events. For example, —an auto parts store may want to confirm new air filters are getting pushed on their store calls. The auto parts store may perform audio analytics to measure the tag score for "new air filter" or event score for "New Air Filter" constituent event to make sure each store is complying with the requirement.

The transcription data for the telephonic conversation can be analyzed in real-time or after the conclusion of the call. The transcription data set can be analyzed as a whole and/or subdivided into data subsets, for example based on the time within the phone call or divided based on when tags are detected—such as when a constituent event occurs. Accordingly, the conversation data set can be divided before or during analysis.

The systems and methods disclosed herein can be used for telecommunications or other data analysis applications, for example for conversation analysis outside of standard telecommunications. For example, an in-person conversation between a customer and a sales clerk in a retail store can be recorded by a headset or lapel microphone worn by the sales clerk, or by microphones detecting ambient noise in the retail store. The recorded conversation can be transmitted over wire or wirelessly (e.g., Bluetooth, RF, over a cellular network, or combinations thereof) by a transmitter or transceiver worn by the sales clerk to a computer located in the retail store or elsewhere. The computer can then record and/or analyze the conversation as described herein.

It is apparent to one skilled in the art that various changes and modifications can be made to this disclosure, and equivalents employed, without departing from the spirit and scope of the invention. Elements and steps shown with any variation herein are exemplary for the specific variation and can be used on or in combination with other variations shown within this disclosure.

We claim:

1. A method for analyzing the content of a telephonic communication comprising:
   converting a verbal conversation in the telephonic communication to text data;
   storing a list of tags in a database;
   organizing the list of tags into at least one tag group;
   assigning an allocated score to at least one tag;
   assigning an event to at least one tag group;
   assigning a threshold score for at least one event, wherein at least one event is an event indicating the resolution of the telephonic communication;
   grouping tags into tag groups;
   detecting tags present in the text data of the telephonic communication within a minimum detection confidence;
   aggregating allocated scores of the tags detected in the text data of the telephonic communication, wherein aggregating allocated scores comprises not adding the allocated score for a repeated tag;
   creating tag paths linking tags to the event indicating the resolution of the telephonic communication; and logging events for which aggregate allocated scores exceed the threshold score, wherein logging events comprises constructing a time map linking when the events were triggered during the call, comprising logging times at which the aggregate allocated scores exceeded the threshold scores; and comprises linking a logged time to a corresponding logged event.

2. The method of claim 1, further comprising logging the relative time between a first event and a second event.

3. The method of claim 1, further comprising constructing a time map illustrating an event path comprising temporal links between the events for which aggregate allocated scores exceed the threshold score.

4. The method of claim 1, further comprising constructing a time map illustrating a tag path comprising temporal links between the detected tags.

5. The method of claim 4, further comprising detecting a terminal tag, wherein construction of the time map illustrating the tag path begins after detection of the terminal tag.

6. The method of claim 1, further comprising logging one or more keywords when conversions have occurred, and comprising adjusting a price for the logged keywords.

7. The method of claim 1, further comprising transmitting call data to a web analysis system, wherein the call data comprises conversion and keyword data from the telephonic communication.

8. The method of claim 1, further comprising creating a visualization of combined web and call data.

* * * * *